United States Patent
Jensen

(10) Patent No.: US 7,084,382 B2
(45) Date of Patent: Aug. 1, 2006

(54) CLIP ON WELDER FOR PLASTIC MATERIAL

(75) Inventor: Joseph C. Jensen, Tucson, AZ (US)

(73) Assignee: Engineering & Research Associates, Inc., Tucson, AZ (US)

(*) Notice: Subject to any disclaimer, the term of this patent is extended or adjusted under 35 U.S.C. 154(b) by 0 days.

(21) Appl. No.: 11/344,784

(22) Filed: Feb. 1, 2006

(65) Prior Publication Data

US 2006/0124637 A1 Jun. 15, 2006

Related U.S. Application Data

(62) Division of application No. 10/799,106, filed on Mar. 12, 2004, now Pat. No. 7,026,592.

(51) Int. Cl.
*H05B 6/62* (2006.01)
*H21L 3/08* (2006.01)

(52) U.S. Cl. ............................ 219/765; 219/52

(58) Field of Classification Search ............... 219/765, 219/603, 633, 764, 766, 767, 768, 769, 607, 219/52

See application file for complete search history.

(56) References Cited

U.S. PATENT DOCUMENTS

| | | | | |
|---|---|---|---|---|
| 2,497,665 A * | 2/1950 | Gravley | 29/25.35 |
| 2,587,175 A | 2/1952 | Lappin | 323/66 |
| 2,647,983 A | 8/1953 | Boyd | 219/47 |
| 3,709,775 A | 1/1973 | James | 428/329 |
| 4,013,860 A | 3/1977 | Hosterman et al. | 219/10.81 |
| 4,186,292 A | 1/1980 | Acker | 219/10.81 |
| 4,390,832 A | 6/1983 | Taylor | 323/273 |
| 4,488,028 A | 12/1984 | Acker et al. | 219/10.81 |
| 4,490,598 A | 12/1984 | Minney et al. | 219/10.81 |
| 4,491,711 A | 1/1985 | Acker | 219/10.81 |
| 4,496,819 A | 1/1985 | Acker et al. | 219/10.81 |
| 5,160,396 A | 11/1992 | Jensen et al. | 156/304.2 |
| 5,256,845 A | 10/1993 | Schippers | 219/10.53 |
| 5,272,304 A | 12/1993 | Been et al. | 219/10.81 |
| 5,313,034 A * | 5/1994 | Grimm et al. | 219/765 |
| 5,349,166 A | 9/1994 | Taylor | 219/643 |
| 5,736,719 A | 4/1998 | Lawson | 219/769 |

(Continued)

OTHER PUBLICATIONS nhs; GENESIS Tube Sealers; undated.

(Continued)

*Primary Examiner*—Daniel Robinson
(74) *Attorney, Agent, or Firm*—Cahill, von Hellens & Glazer P.L.C.

(57) ABSTRACT

A clip on welder includes two pairs of opposed grippers defined by pivotally attached upper and lower frames for latching the welder to heat weldable material, such as a length of tubing, upon actuation of a start button by an operator; thereafter, the welder operates unattended. At least a jaw of a pair of jaws disposed intermediate the two pairs of grippers heats the material compressed and lodged therebetween to form a weld in or across the material. A source of gas, such as air, under pressure selectively connected to a bellows provides the power to pivot the upper and lower frames into gripping engagement with the material. A source of electrical signals provides the power to heat the material intermediate the pair of jaws. One or more thermocouples senses the heat of the jaws and generates signals used to control the application of power and to control cooling. After completion of the weld, cooling air is directed to the jaws until the thermocouple(s) signal(s) indicates a sufficiently low temperature. Release of the welder from the material is in response to actuation of a stop button by the operator.

11 Claims, 6 Drawing Sheets

U.S. PATENT DOCUMENTS

| | | | |
|---|---|---|---|
| 5,750,971 A | 5/1998 | Taylor | 219/769 |
| 5,932,132 A | 8/1999 | Plemons | 219/769 |

OTHER PUBLICATIONS

Baxter; Hematron III Hand-held Tube Sealer; 2002.
Baxter; HandySeal Mobile, Battery-operated, Hand-held Tube Sealer; 2002.
Baxter; AutoSeal Portable, Battery-operated, Hand-held Tube Sealer; 2000.
Teruflex; ACS-152 Dielectric Sealer; undated.
Ace Medical inc; Ace Sealer-01 Ultrasonic wave tube sealer; undated.
National Hospital Specialties; Biosealer-Tube Sealers CR 6, CR 6-PS, CR 4; undated.
NPBI B.V.; Composeal Mobilea portable, battery powered sealer; undated.
Hemopharm; Tube Sealers BT200, BT300, BT400, CS600A, CS600B;undated.
Ljungberg & Kögel AB; Biosealer CR 6-PS; undated.
BioTrans; Composeal, ; undated; Brochure No. B022-0294.
Wave Biotech LLC; Hot Lips Tube Sealer; undated; website www.wavebiotech.com/products/hot_lips/index.html.
Consolidated Polymer Technologies, Inc.; C-Flex Advanced Aseptic Connecting Device; undated; Catalog No. ACD200-2.

* cited by examiner

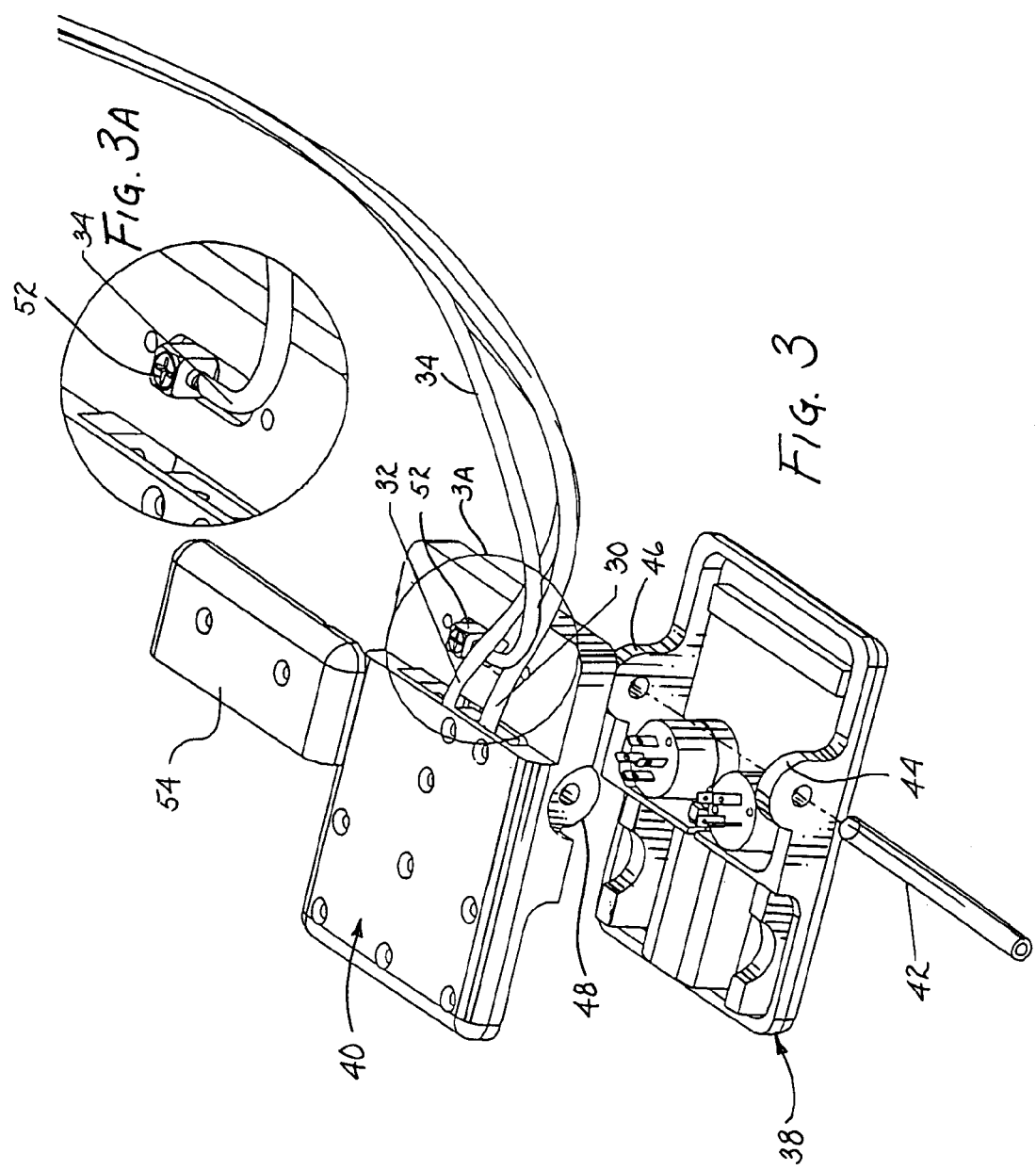

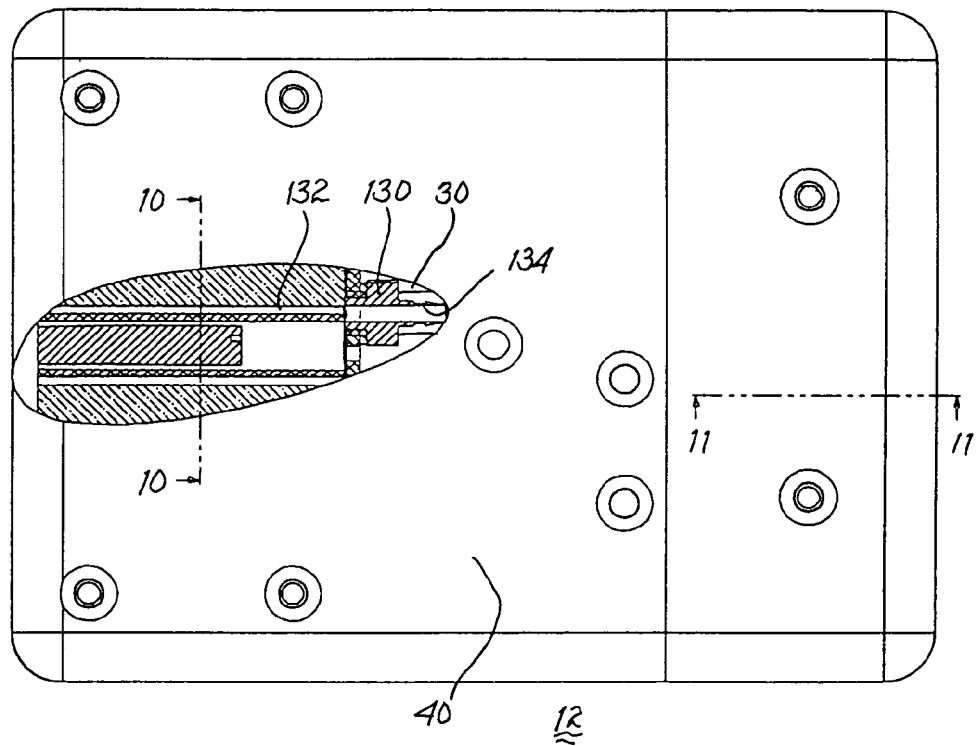
FIG. 9
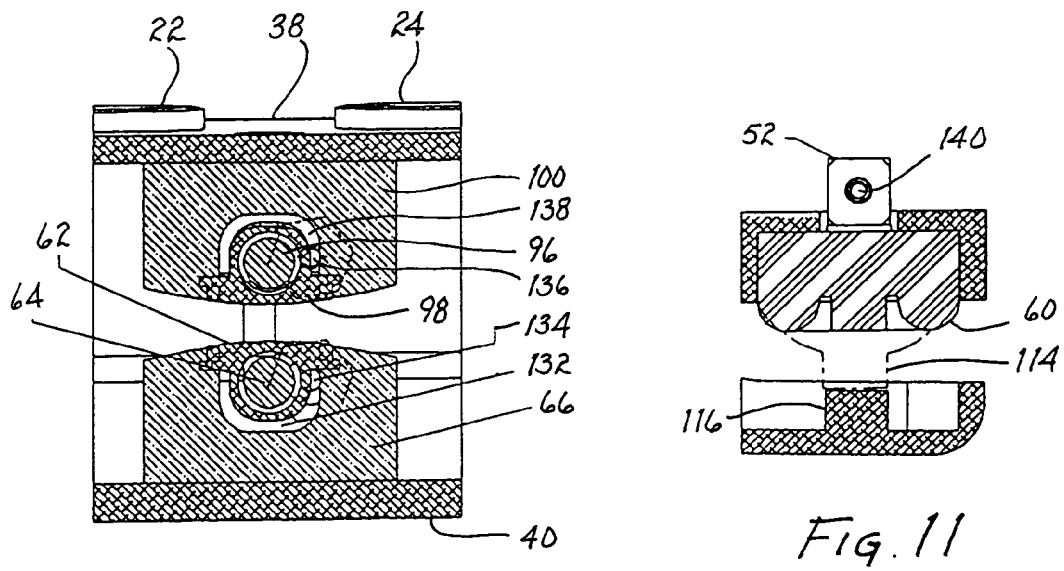
FIG. 10
FIG. 11

CLIP ON WELDER FOR PLASTIC MATERIAL

CROSS REFERENCE TO RELATED APPLICATIONS

The present application is a division of and claims priority to an application entitled "CLIP ON THERMAL WELDER", filed Mar. 12, 2004, assigned Ser. No. 10/799,106, now U.S. Pat. No. 7,026,592, which application is directed to an invention made by the present inventors and assigned to the present assignee.

BACKGROUND OF THE INVENTION

1. Technical Field of the Invention

The present invention relates to tubing welders and, more particularly, to clip on unattended welders for forming a seal in a length of tubing to seal the tubing.

2. Description of Related Art

It is well known that plastic materials may be welded to one another by the application of heat. Many prior art devices developed for this purpose are essentially immobile units particularly adapted for mass production requirements in a manufacturing facility.

As suggested above, plastic materials may be welded to one another by application of heat. Numerous devices have been developed for this purpose of which the following descriptions are representative. U.S. Pat. No. 2,529,717 describes an RF energized heat sealer wherein one electrode of a pair of electrodes is removable to accommodate placement of the material to be sealed between the electrodes; a constant RF energy level is applied for a timed duration to effect the seal. U.S. Pat. No. 2,629,809 is directed to a manually operated device for compressing thermoplastic material between an anvil and a hammer whereupon RF energy is applied until the hammer has been raised to a predetermined height. U.S. Pat. No. 2,751,965 illustrates a bag sealer employing a first timing circuit for maintaining compressed the opening of the bag intermediate electrodes and a second timing circuit for applying a fixed level of RF energy. U.S. Pat. No. 3,040,153 illustrates a yarn splicer having a pair of pinchers for compressing yarn ends intermediate fixed position electrodes between which RF energy is transmitted to fuse the yarn ends to one another. U.S. Pat. No. 3,232,810 illustrates the use of a tuned cavity to regulate the transmission of RF energy for sealing polyester materials. U.S. Pat. No. 3,518,396 is directed to a series of resonant circuits which preclude the work piece from altering the heat distribution pattern of a dielectric heating apparatus. U.S. Pat. No. 3,632,943 describes a dielectric heat sealer which incorporates a liquid filled coil as a cooling medium to ensure uniformity of the seals; shield means are also employed to prevent spurious RF leakage. U.S. Pat. No. 3,738,892 illustrates two spaced apart conductive members for inductively heating and welding two adjacent sheets of plastic to one another without an attendant compression of the sheets.

There is a continual existing need for blood donors in order to meet the day to day hospital demands for blood. Consequently, many private organizations, whether or not affiliated with hospitals, have arisen for the sole purpose of collecting blood. In order to obtain sufficient quantities of blood, these organizations must visit locations having a high concentration of blood donors. That is, they must periodically visit schools, office buildings, factories and the like and they must transport all equipment necessary to collect the donated blood.

Normally, the blood is drawn from a donor through flexible tubing extending into a plastic bag. Once the bag is filled to its capacity, the tubing must be sealed to prevent leakage and, more importantly, prevent deterioration of the collected blood. Because of the required mobility and rapid processing of a blood collection unit, any and all equipment required must be specifically designed for compact storage, minimum reliance upon support facilities at the blood collection location, minimum operating and set up times and ease of operability.

Plastic tubing, particularly of the type used in conjunction with the collection of blood, is relatively fragile and is easily burst when heated to a temperature close to its melting point. To effectively and repetitively accurately heat seal or weld such tubing, certain parameters must be observed. The heat applied should be limited to the heat necessary to effect a weld. The locality of the applied heat should be focused upon the actual physical section upon which the weld is to be made to preclude softening of adjacent material as such softening may permit the fluid, under pressure within the tubing, to burst the tubing.

To meet the need for readily and easily sealing blood filled plastic tubing, a hand held operated tubing sealer has been developed and is described in U.S. Pat. No. 4,013,860 entitled "Hand Held Electromechanical Sealer", assigned to the present assignee and incorporated herein by reference. This sealer is a readily transportable sealer of small size and is hand operated to form heat seals in any plastic tubing placed intermediate its jaws. Thus, it is readily usable to form seals at the donor site prior to withdrawing the needle and maintaining a sterile closed system. Also, a plurality of sealed segregated compartments along a length of tubing filled with blood can be completed, wherein each of the compartments is identified with a common serial number. Thereafter, the compartments may be segregated from one another and various tests may be preformed upon the sample of blood contained in the compartments. This capability is particularly important where testing is necessary and yet maintenance of the seal for the blood within the attendant collection bag is not to be disrupted or broken.

At most blood collection centers, such as those operated by the Red Cross, much of the manual labor is performed as charitable work by older persons. These persons are physically handicapped by the natural processes of aging, by arthritis or by previous injuries. For those persons whose hands are not strong or who suffer pain when they attempt to grip an article with their hands, a hand held sealer is difficult or painful to use. Consequently, the rate of production of seals is essentially slower than optimum. A desk mounted sealer described in U.S. Pat. No. 4,186,292, assigned to the present assignee and incorporated herein by reference, is usable by an operator who is either seated or standing and it provides a direct line of sight for the operator in either position. Thereby, operator fatigue is diminished and accurate positioning of the liquid filled tubing to be automatically sealed is promoted. Through actuation of a tubing position sensing switch or a foot operated switch, a seal will be effected in the tubing placed intermediate a fixed and a movable jaw, thereby allowing the operator to use one or both hands to repetitively place and reposition the tubing intermediate the jaws. The housing for the sealer sealingly encloses the operative elements to preclude seepage of fluid thereinto from a burst liquid filled length of tubing. The shaft supporting the moveable jaw and extending from within the housing is sealed through a wiping seal. The jaws themselves and the attendant structure are developed from large mass heat conducting material to dissipate the heat generated by the jaws and to preclude heat build up for the benefit of both the operator and the integrity of the formed seals.

U.S. Pat. No. 4,390,832, assigned to the present assignee and incorporated herein by reference, describes an RF generating circuit for providing a source of RF energy to seal a length of tubing placed intermediate a pair of jaws. The pair of jaws are electrically connected to the source of RF energy as plates of a variable capacitor in an RF resonant circuit. The flow of RF energy across the pair of jaws, which energy heats the tubing and, in conjunction with mechanical pressure, makes the weld, is a function of timing and of the spacing between the jaws, which spacing affects the degree of resonance of the RF resonant circuit. Simultaneous with the heating of the tubing, the configuration of the pair of jaws compresses the tubing placed therebetween and focuses the RF energy in a narrow swath across the tubing while simultaneously elongating and spreading the tubing at the swath to obtain a leak free weld. The resulting weld is configured to provide for separation of the sealed compartments of the tubing without tearing or rupturing the compartments.

In U.S. Pat. No. 4,529,859, assigned to the present assignee and incorporated herein by reference, a solenoid operated moveable jaw is disclosed which cooperates with a fixed jaw protruding from a blood tubing sealing unit and formed as part of a relatively massive heat sink to effect seals on liquid filled plastic tubing upon transmission of RF energy timed to coincide with a degree of initial mechanical compression of the tubing by the jaws after the movement of the moveable jaw has been triggered by the tubing intercepting and reflecting a beam of light. Dissipation of heat from the exposed parts of the fixed jaw is by convention. Dissipation of heat from the enclosed part of the fixed end moveable jaws and that produced by the circuitry generating the RF energy internal to the sealer unit is effected by channeling the heat by conduction from all internal heat sources to the bottom and rear plates of the unit and dissipating the heat from the bottom and rear plates to the atmosphere by convection.

U.S. Pat. No. 5,750,971, assigned to the present assignee and incorporated herein by reference, discloses the use of RF power for melting, sealing and welding plastic tubing compressed between a pair manually or automatically actuated electrically conducting jaws of a hand held or fixed base tubing sealer. The RF power is regulated by a pulse width modulator controlling the duty cycle of applied constant voltage pulses. A predetermined change of impedance of the tubing during compression and melting is detected to regulate the power applied and to ensure a weld of predetermined physical parameters. On completion of the weld, a first timer is reset and a further weld may be made. In the event of impedance mismatch, a second timer inhibits further application of power and resetting of the first timer. The use of the pulse width modulator enhances conservation of the power and accommodates portability of the tubing sealer through use of rechargeable batteries as the power source.

Each of the tubing sealers described or referenced above, require attendance by an operator during the sealing process. Depending upon the size and material of the tubing to be sealed as well as the rate and level of power applied to effect heating to form the weld, each weld may take tens of seconds or in excess of a minute. At blood collection centers, the use of hand held or desk mounted tubing sealers requires the attendance of an operator for the duration of the seal(s) to be made. For efficiency purposes and to simultaneously harvest as much collected blood as possible from as many donors as possible while engaging as few operators as possible, elimination of operator time to effect a seal(s) is desirable as such an operator can attend to other matters while a seal(s) is being formed.

SUMMARY OF THE INVENTION

A clip on welder includes two pairs of opposed grippers defined by pivotally attached upper and lower frames for latching the welder to a length of tubing. By pushing a start button an operator will cause a bellows to inflate in response to air flow from a source of compressed air to force the frames to pivot relative to one another and bring two pairs of grippers into latching engagement with the tubing. At least a jaw of a pair of jaws disposed intermediate the two pairs of grippers thereafter heats the tubing compressed and lodged therebetween to form a weld across the tubing. A source of electrical signals actuated by the operator pushing the start button provides the power to heat the jaws which heat the tubing intermediate the pair of jaws.

One or more thermocouples associated with the jaws sense the heat of the jaws and generate signals used by a programmed controller to control application of power to the jaws. After a specified temperature has been reached for a period of time, commensurate with the formation of a weld, power to the jaws is terminated. Thereafter, cooling air from a source of compressed air is directed to the jaws to cool them until a specified reduced temperature is reached. The bellows will remain inflated and the welder latched to the tubing until an operator depresses a stop button and thereby permit exhausting the air form the bellows.

It is therefore a primary object of the present invention to provide a welder for welding a heat weldable material while unattended by an operator.

Another object of the present invention is to provide a welder attachable to and supported by the heat weldable material to be welded and without attention of an operator during the welding process.

Still another object of the present invention is to provide a tubing welder for forming a weld in tubing which welder may be attached to and removed from a length of the tubing at the convenience of an operator and without requiring attendance by the operator during formation of the weld.

Yet another object of the present invention is to provide a clip on tubing welder that requires minimal instruction on the operation of the welder.

A further object of the present invention is to provide a clip on welder that may incorporate any of various heat generating elements to form a seal across a length of tubing placed between a pair of jaws.

A still further object of the present invention is to provide a clip on tubing welder to form a seal unattended by an operator and to automatically cool the heated jaws upon completion of the seal.

A yet further object of the present invention is to provide a method for forming a weld in a heat weldable material while unattended by an operator.

A yet further object of the present invention is to provide a method for attaching a welder to and supporting the welder from heat weldable material that is to be welded and during formation of the weld.

A yet further object of the present invention is to provide a method for effecting a seal across a length of tubing with a clip on tubing welder that operates unattended to form the seal and subsequently cool the operative elements.

These and other objects of the present invention will become apparent to those skilled in the art as the description thereon proceeds.

BRIEF DESCRIPTION OF THE DRAWINGS

The present invention will be described with greater specificity and clarity with reference to the following drawings, in which:

FIG. 3 is an exploded view of the welder with certain components removed therefrom;

FIG. 3A is an enlarged view of the structure within circle 3A shown in FIG. 3;

FIG. 9 is a bottom view of the welder;

FIG. 10 is a partial cross sectional view taken along lines 10—10, as shown in FIG. 9;

FIG. 11 is a partial cross sectional view taken along lines 11—11, as shown in FIG. 9.

DESCRIPTION OF THE PREFERRED EMBODIMENT

Figure 1:
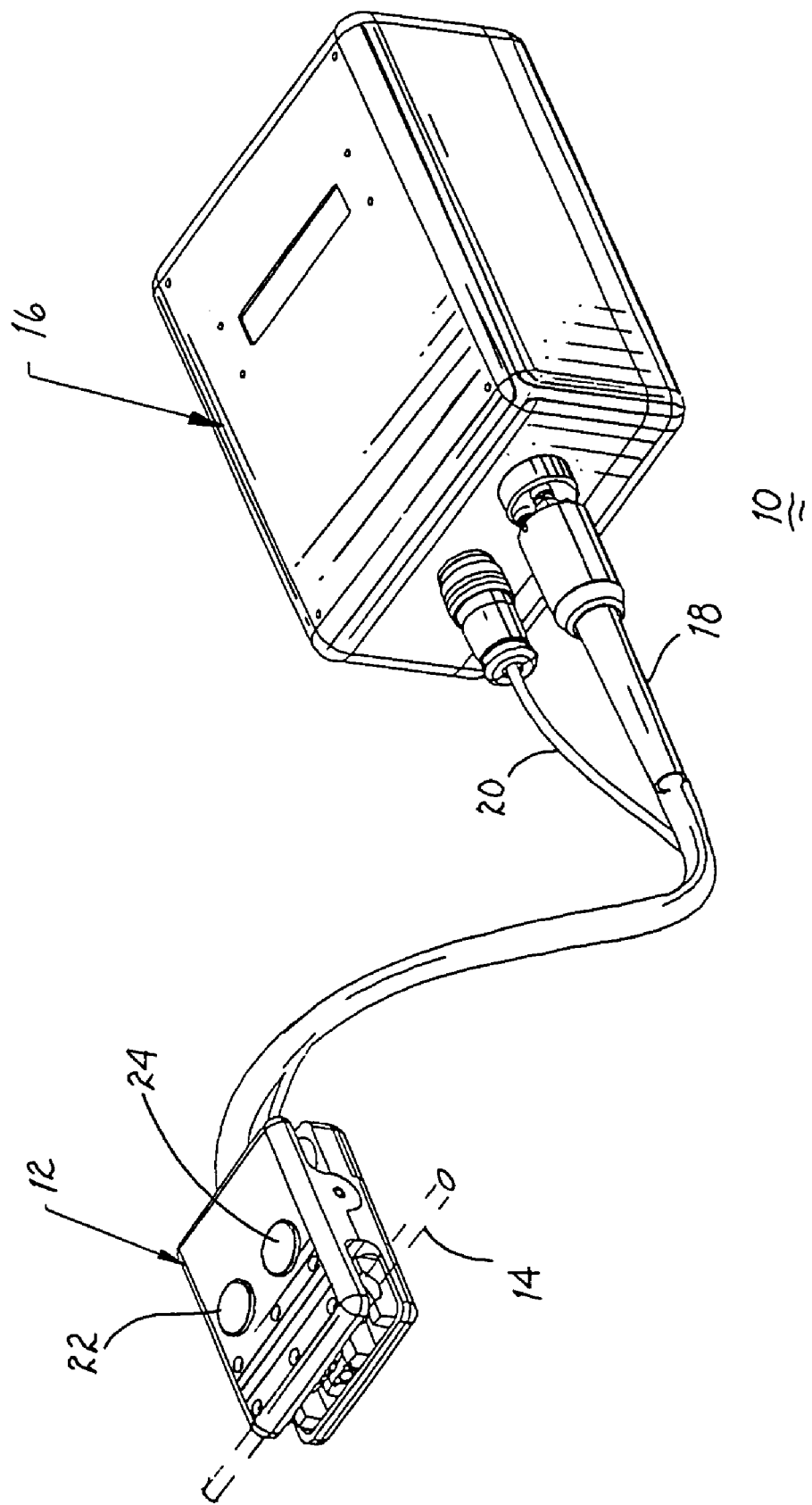
FIG. 1 illustrates the clip on welder coupled to a housing having a source of air under pressure and a source of electrical signals for operating the welder.

Referring to FIG. 1, there is shown a tubing welder assembly 10 for performing a seal across a heat weldable length of tubing. The assembly includes a clip on welder 12 engaging a representative length of tubing 14 engaged thereby, as illustrated. A support housing 16 contains a source of a gas, such as air, under pressure (not shown) and a source of electrical signals (not shown). The gas under pressure is conveyed through a plurality of pneumatic conduits enveloped within a sleeve 18 to welder 12. A plurality of electrical signals are conveyed from within housing 16 through a cable 20 to the welder. After the welder has been brought into engagement with tubing 14, as illustrated, a start button 22 is depressed. On actuation of the start button, the tubing will be gripped by the welder to support the welder and permit unattended operation of the welder during formation of the weld across the tubing to form a seal. On completion of the weld, the element(s) providing the requisite heat are deactivated and the element(s) are cooled by a flow of air. At some point thereafter, an operator would depress stop button 24 to permit disengagement of the welder from the tubing. Thus, the operation of welder 12 requires operator involvement only to the extent of attaching and detaching the welder from the tubing.

While the above discussion is a summary of the preferred embodiment, variations thereof can be made without departing from the spirit and scope of the invention. For example, the welder will work in conjunction with any heat weldable tubing irrespective of size and wall thickness or whether the tubing is empty or filled with blood (as it might be used in a blood collection center). Other fluids of any type can also be present within the tubing during formation of a weld. The welder is not restricted to use with tubing. It will form a weld unattended by an operator upon any heat weldable material, whether it be a sheet, a film, or other physical configuration. The type, nature, size and configuration of the weld is a function of the commensurate configuration of the jaw or jaws used to heat the heat weldable material and the nature of the type of energy applied to heat the heat weldable material. For example, two or more sections of material may be welded to one another to join them or to form a compartment therebetween or other delineation. And, it is possible to weld together heat weldable materials of different physical configurations by corresponding adaptations of the jaws to be energized.

Figure 2:
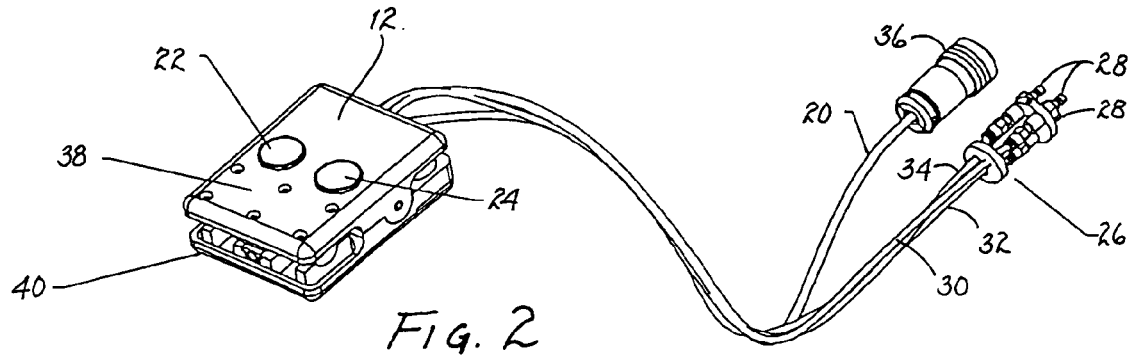
FIG. 2 is similar to FIG. 1 but certain components have been removed.

FIG. 2 is similar to FIG. 1 except that the housing is missing along with sleeve 18 enveloping the pneumatic conduits. As illustrated, a pneumatic fitting 26 includes three hollow prongs 28 for engagement with respective sources of air pressure within housing 16. The air pressure attendant each of these prongs is conveyed through three pneumatic conduits 30, 32 and 34 to welder 12. Similarly, electrical plug 36 interconnects a plurality of electrical conductors within cable 20.

As particularly shown in FIG. 3, upper frame 38 and lower frame 40 are pivotally attached to one another by a shaft 42 engaging apertured ears 44, 46 of upper frame 38 and mating ears (of which ear 48 is shown) of lower frame 40. Conduits 30, 32 covey a flow of air on command to cool the heating elements on completion of the weld, as will be described in further detail below. Conduit 34 conveys a flow of air to a pneumatic fitting 52 in fluid communication with a bellows to be described (see FIG. 3A). A cover plate 54 is detachably attached to lower frame 40 to permit access to the pneumatic conduits entering the welder; preferably, the cover plate is hollowed to accommodate the conduits and the fitting and suitably notched to permit passage of the conduits.

Figure 5:
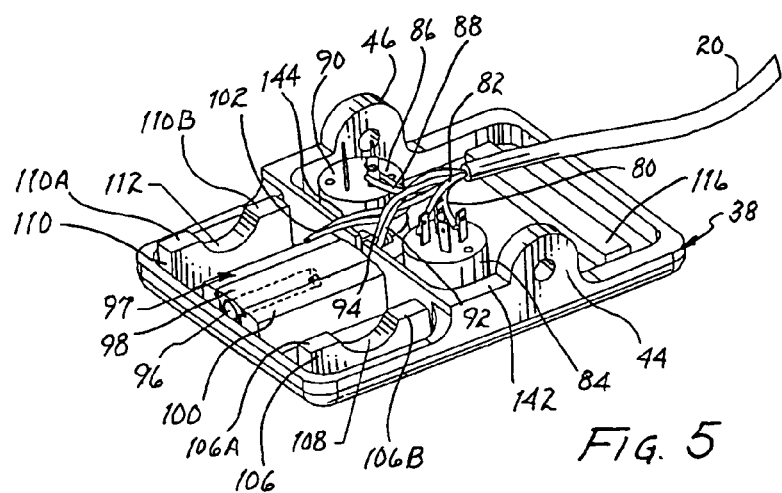
FIG. 5 illustrates the interior of the top frame of the welder.
Figure 4:
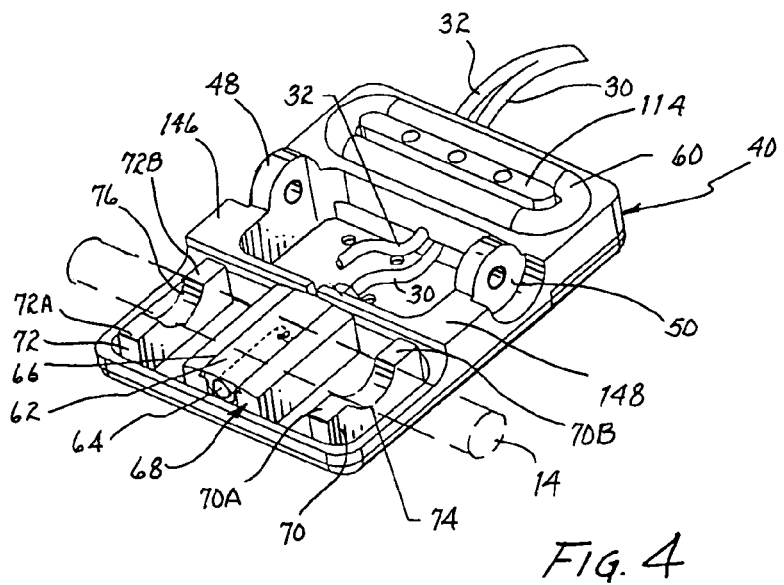
FIG. 4 illustrates the interior of the bottom frame of the welder.

FIG. 4 illustrates the components interior to lower frame 40. As discussed above, ears 48, 50 pivotally engage ears 44, 46 in upper frame 38 via shaft 42. A conduit 32 conveys a flow of air to a passageway partly surrounding electrode 62, which electrode envelops heating element 64 of jaw 68. The electrode is embedded within a ceramic jaw holder 66, as will be described in further detail below. Pneumatic conduit 32 is in fluid communication with the corresponding components in upper frame 38. A pair of grippers 70, 72 are disposed on opposed sides of holder 66. Each of these grippers includes an oval like depression or the depression may be circular but defining less than half a circle; the two depressions are identified by numerals 74, 76 corresponding with grippers 70, 72, respectively. Gripper 70 also includes a pair of flats 70A, 70B disposed on opposed sides of depression 74. Gripper 72 includes similar flats 72A, 72B. As representatively shown, a length of tubing 14 is supported by the depressions in grippers 70, 72. As shown in FIG. 5, upper frame 38 includes a gripper 106 having a depression 108 and flats 106A and 106B extending from the depression. Similarly, gripper 110 includes a depression 112 and flats 110A and 110B extending from the depression.

Referring to FIG. 5, further components interior of upper frame 38 are illustrated. Cable 20 includes a plurality of electrical conductors for conveying power and the requisite control signals to the components within the upper frame. In particular, conductors 80, 82 go to switch 84 corresponding with start button 22. Conductors 86, 88 go to switch 90 corresponding with stop button 24. Conductors 92, 94 go to heating element 96 of jaw 97 disposed within electrode 98 of jaw holder 100. Conductors 102, 104 go to heating element 64 (see FIG. 4) in lower frame 40. Additionally, electrical conductors (not shown) exist within cable 20 that interconnect circuitry within housing 16 with thermocouples or other temperature/heat sensing devices that may be used to sense the temperature/heat of the heating elements and/or jaws to be described below. A bar 116 depends from the base of upper frame 38 for cooperative engagement with a similar bar 114 supported by bellows 60 (see FIG. 4).

Figure 6:
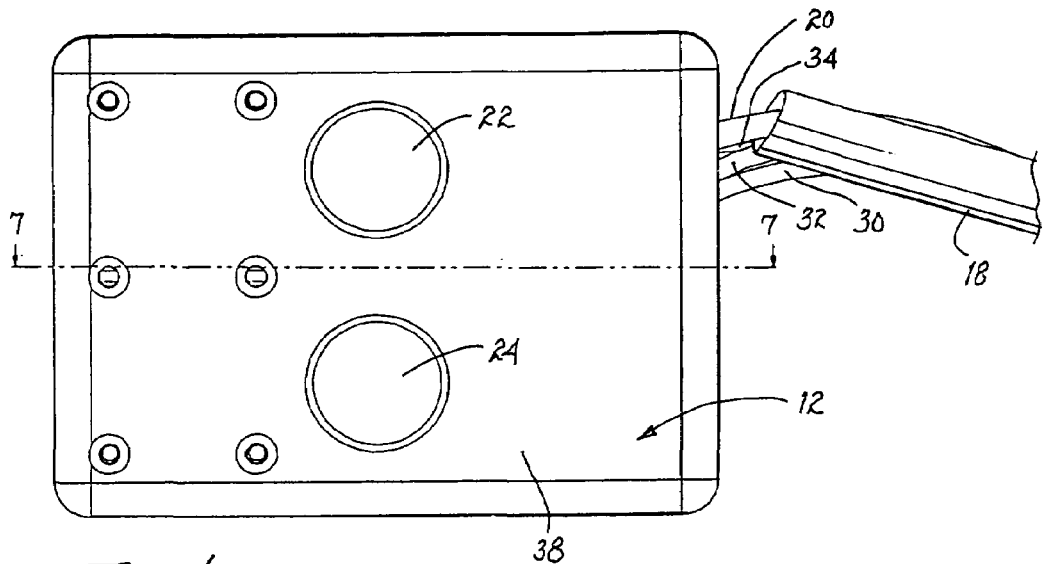
FIG. 6 is top view of the welder.
Figure 7:
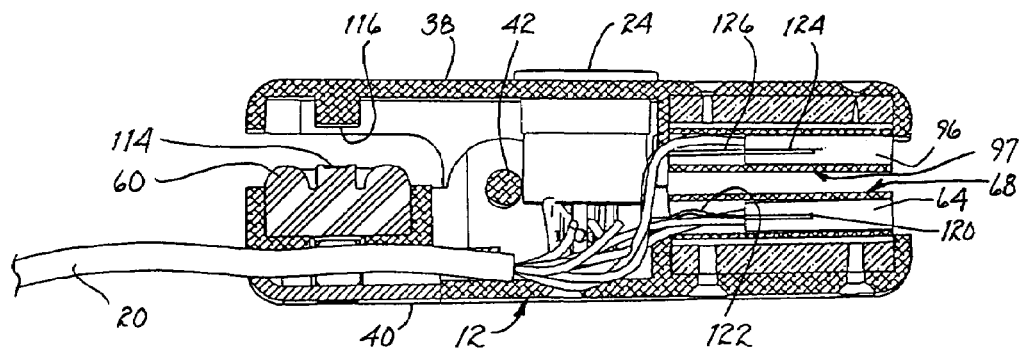
FIG. 7 is a cross sectional view of the welder taken along lines 7—7, as shown in FIG. 6.
Figure 8:
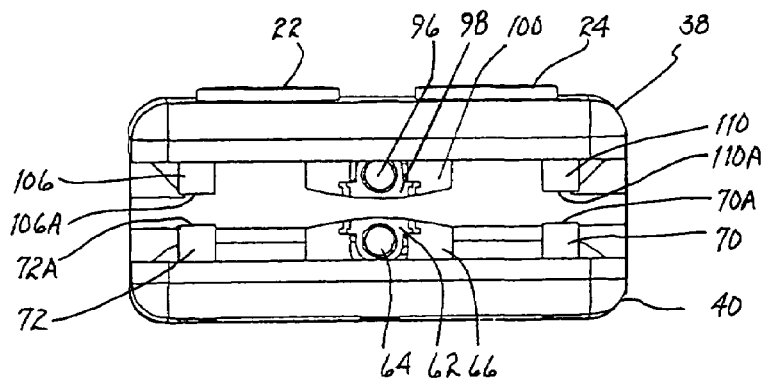
FIG. 8 is an end view of the front of the welder.

Referring jointly to FIGS. 6, 7 and 8, additional structural elements and their relationships to one another will be described. Heating element 64 includes a thermocouple 120 lodged therein or adjacent thereto to sense the temperature of the heating element and/or the jaw. It is connected to circuitry within housing 16 by an electrical conductor 122. Similarly, heating element 96 includes a thermocouple 124 for the purpose of sensing the temperature of the heating element and/or the jaw; it is also connected to electrical circuitry within housing 16 by an electrical conductor 126. These thermocouples or other temperature/heat sensing devices may be differently located in conjunction with either or both jaws in the alternative or in addition. Thereby, the temperature of the heating elements (and/or jaws) is determinable during operation of the heating elements. Shut off of power to the heating elements, once a predetermined temperature is reached or maintained for a specified period of time, will occur by operation of the circuitry within housing 16 (see FIGS. 1 and 12). The shut off temperature in combination with duration at a specified temperature is a function of the material of the tubing to be welded.

Bellows 60 includes bar 114 which is extended upon inflation of the bellows to bear against bar 116 and cause pivotal movement of upper and lower frames relative to one another to urge electrodes 62, 98 (jaws 68, 97) toward one another causing compression of the tubing disposed therebetween and flatten the tubing to place the opposed inside surfaces adjacent another. Simultaneously, the two pairs of grippers in the upper and lower frames engage the tubing disposed therein to grip the tubing and thereby attach or latch welder 12 to the tubing.

Upon expansion of bellows 60, the resulting upward movement of bar 114 and bearing against bar 116 will cause the upper and lowers frames to pivot with respect to one another. Grippers 70, 72 in lower frame 40 and grippers 110, 106 in upper frame 38 will be repositioned toward one another an amount sufficient to grip the tubing disposed in the corresponding depressions. As the tubing will become squeezed, it will expand laterally. To accommodate such expansion, flats 70A, 70B are spaced apart from flats 110A, 110B and flats 72A, 72B are spaced apart from flats 106A, 106B. Electrode 62 (jaw 68) will become located a distance from electrode 98 (jaw 97) essentially equivalent to and preferably somewhat less than twice the wall thickness of the tubing being welded. This limited travel is controlled by wall sections 142, 144 in upper frame 38 coming in contact with wall sections 146, 148 in lower frame 40, respectively, as shown in FIGS. 4 and 5.

Referring jointly to FIGS. 9, 10 and 11, features attendant the pneumatic operation of welder 12 will be described. Pneumatic conduit 30 is attached to an hollow barb 130 defining a passageway 134 to provide fluid communication with a passageway 132 partly surrounding electrode 62 encasing heating element 64. Passageway 132 extends forwardly to exhaust the air flowing therethrough at the front of the welder. Similarly, pneumatic conduit 32 is connected to an hollow barb having a passageway 136 to provide a flow of air to passageway 138 surrounding electrode 98 and embedded heating element 96 (jaw), which passageway also exhausts air at the front of the welder. Thereby, after a weld has been performed, the electrodes and their heating elements (jaws) are cooled by the air flow. Upon termination of the weld, any lingering heat from the electrodes will not compromise the weld made.

FIG. 11 illustrates, in dashed lines, extension of bellows 60 upon an inflow of air from passageway 140 in fitting 52. As illustrated, bar 114 is in engagement with bar 116 and will cause pivotal movement of the upper and lower frames relative to one another.

Figure 12:
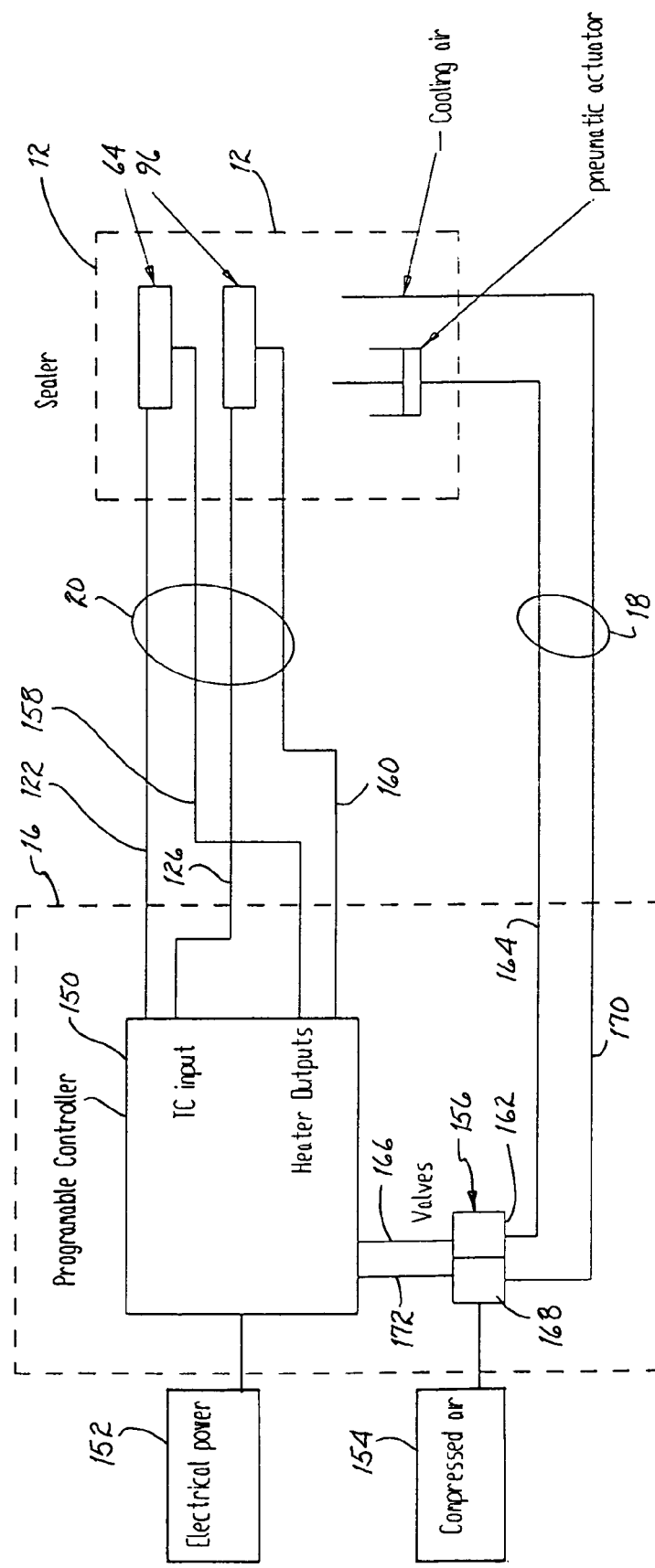
FIG. 12 is a schematic of the welder and its operative components.

FIG. 12 is a schematic of the operative and functional elements of welder 12 and housing 16. Housing 16 includes a programable controller 150 for controlling generation of various electrical signals necessary for operation of welder 12; the electrical conductors therefor are representatively identified by numeral 20. In addition, it controls operation of the pneumatic system for pivoting the upper and lower frames of the welder and for providing controlled air flow to the electrodes; the pneumatic conduits therefor are representatively identified by numeral 18. A source 152 of electrical power, whether it be a portable battery or conventional house current, provides the requisite electrical power to the programable controller. Similarly, a source 154 of compressed air provides compressed air to a set of valves 156. It may be noted that a gas other than air may be used. The programable controller provides electrical power to each of heating elements 64, 96 through pairs of electrical conductors 158, 160. Electrical conductors 122, 126 are in communication with the respective thermocouples lodged in conjunction with heating elements 64, 96, respectively, and provide indicia responsive to the temperature of the respective heating elements. The sensed temperatures provide an input to the control circuitry of the programmable controller to bring about termination of power to the heating elements once the requisite and predetermined temperature has been reached and/or maintained for a predetermined time period. These conductors are within cable 20, as discussed above. Valve 162 is an electrically actuated valve for selectively conveying air from source 152 into conduit 164 in response to a control signal transmitted via conductor 166. As representatively shown and identified as a pneumatic actuator, bellows 60 (described above) will inflate in response to a flow of air through conduit 164. On completion of the weld, a valve 168 is actuated to provide a flow of air from source 154 through conduit 170 to exhaust air into the passageways in each of the jaws, as described above. This valve is controlled by signals transmitted from the programable controller through conductor 172. When the programable controller senses, through the signals generated by the thermocouples, that the jaws are sufficiently cooled, valve 168 is closed and further cooling air flow will not occur. Upon actuation of stop button 24, valve 162 will release the air pressure within conduit 164 and the bellows will collapse. Thereafter, the jaws of the upper and lower frames may be manually (or under urging of a spring or the like) separated from one another to permit withdrawal of the tubing disposed therebetween.

In the present embodiment, each of the heating elements is a simple resistive cartridge heater commercially available in the market place. However, numerous other devices could be used to cause heating of the tubing to be welded between the jaws, including RF energy (as described above in certain of the assignee's patents), inductive heating, sonic heating or radiant heating. Moreover, the power provided may be AC, DC or radiant energy.

While the presently contemplated primary use of the present invention relates to heat weldable tubing of any of many types of chemical compositions, other forms of heat weldable materials could be welded. These forms may be bags to be sealed, segregation of chambers between sheets of material, etc.

I claim:

1. A clip on welder for making a weld in a heat weldable material, said welder comprising in combination:
  a) a source of a gas under pressure;
  b) a source of electrical signals;
  c) an upper frame, a lower frame and pivot means for pivotally interconnecting said upper and lower frames;
  d) an expandable and contractible pneumatic bladder responsive to said source of a gas under pressure for urging pivotal movement of said upper and lower frames relative to one another to engage the material therebetween;
  e) a pair of spaced apart grippers disposed in said lower frame in operative engagement with a further pair of spaced apart grippers disposed in said upper frame for gripping the material to be welded;
  f) a first jaw disposed in said lower frame intermediate said pair of grippers and a second jaw disposed in said upper frame intermediate said pair of further grippers and in opposed relationship to said first jaw for compressing the material placed therebetween and effecting a weld;
  g) an element for heating the material to effect a weld and being disposed in at least one jaw of said first and second jaws, said element being in operative engagement with said source of electrical signals; and
  h) a cooling assembly for cooling at least one jaw of said first and second jaws on completion of the weld in response to signals from said source of electrical signals and operatively responsive to said source of gas under pressure to provide a flow of gas proximate said first and second jaws.

2. A clip on welder as set forth in claim 1 including a thermocouple in operative engagement with said heating element for sensing the temperature of said heating element and for providing a signal to said source of electrical signals reflective of the temperature sensed.

3. A clip on welder as set forth in claim 1 including a further element for heating being disposed in the other of said first and second jaws, said further heating element being in operative engagement with said source of electrical signals.

4. A clip on welder as set forth in claim 3 including a thermocouple in operative engagement with each of said heating element and said further heating element for sensing the temperature of said heating element and said further heating element and for providing respective signals to said source of electrical signals reflective of each of the temperatures sensed.

5. A clip on welder as set forth in claim 1 wherein each of said upper and lower frames includes opposing wall sections for limiting the degree of compression of the material.

6. A clip on welder for making a weld in a heat weldable material, said welder comprising in combination:
  a) a first frame, a second frame and a pivot for pivotally interconnecting said first and second frames;
  b) a jaw disposed in each of said first and second frames for compressing and sealing the material placed thereacross;
  c) a first pair of grippers disposed on opposed sides of said one jaw in one of said first and second frames and in operative engagement with a second pair of grippers disposed in the other of said first and second frames for gripping the material;
  d) a bellows for selectively actuating pivotal movement of said first and second frames to cause said first and second pairs of grippers to grip the material and to compress the material between said jaws; and
  e) an element disposed in at least one of said jaws for heating the compressed material placed thereacross.

7. A clip on welder as set forth in claim 6 wherein each of said first and second frames includes opposing wall sections for limiting the degree of compression of the material.

8. A clip on welder as set forth in claim 6 including a programmable controller for controlling operation of said source of air pressure and of the heating of said at least one jaw.

9. A clip on welder as set forth in claim 8 including a thermocouple associated with at least one of said heating elements for sensing the temperature of each of said jaws and for transmitting a signal indicative of the temperature sensed to said programmable controller.

10. A clip on welder as set forth in claim 8 including a cooling assembly for cooling each of said heating elements with a flow of air, said cooling assembly including a source of air under pressure, a passageway disposed in proximity to each of said heating elements for exhausting the flow of air to the atmosphere and a conduit interconnecting each passageway of said passageways with said source of air under pressure and a valve responsive to said programmable controller for controlling the flow of air to each passageway of said passageways.

11. A clip on welder as set forth in claim 6 including limit means for limiting movement of said jaws toward one another to a distance which is a function of the material and the degree of compression sought.

* * * * *